(12) United States Patent
Takahashi et al.

(10) Patent No.: US 7,714,085 B2
(45) Date of Patent: May 11, 2010

(54) PRODUCTION METHOD OF POLYMERS BY USING LIVING ANIONIC POLYMERIZATION METHOD

(75) Inventors: Eiji Takahashi, Ichihara (JP); Shoji Yamaguchi, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 756 days.

(21) Appl. No.: 11/570,316

(22) PCT Filed: Jun. 8, 2005

(86) PCT No.: PCT/JP2005/010485

§ 371 (c)(1),
(2), (4) Date: Dec. 8, 2006

(87) PCT Pub. No.: WO2005/121189

PCT Pub. Date: Dec. 22, 2005

(65) Prior Publication Data

US 2007/0225457 A1 Sep. 27, 2007
US 2008/0045677 A2 Feb. 21, 2008

(30) Foreign Application Priority Data

Jun. 9, 2004 (JP) .............................. 2004-170963
Oct. 4, 2004 (JP) .............................. 2004-290963

(51) Int. Cl.
*C08F 4/46* (2006.01)
(52) U.S. Cl. ...................... 526/173; 526/177; 526/187; 526/335; 526/317.1; 526/77
(58) Field of Classification Search ................ 526/173, 526/177, 187, 346, 335, 317.1, 77
See application file for complete search history.

(56) References Cited

U.S. PATENT DOCUMENTS

| | | | | |
|---|---|---|---|---|
| 3,716,495 | A * | 2/1973 | Hsieh | .......................... 502/153 |
| 3,847,883 | A * | 11/1974 | Kamienski et al. | .......... 526/173 |
| 4,139,490 | A * | 2/1979 | Halasa et al. | ................ 502/154 |
| 4,252,925 | A * | 2/1981 | Fukuda et al. | ................. 526/77 |
| 6,429,273 | B1 * | 8/2002 | Ebara | ......................... 526/346 |
| 6,455,651 | B1 | 9/2002 | Willis et al. | |
| 6,686,423 | B1 * | 2/2004 | Desbois et al. | .............. 526/177 |

FOREIGN PATENT DOCUMENTS

| | | | |
|---|---|---|---|
| JP | 54-138087 | | 10/1979 |
| JP | 62185031 | | 8/1987 |
| JP | 11-080220 | * | 3/1999 |
| JP | 11-80220 A | | 3/1999 |
| JP | 2002-145920 | * | 5/2002 |
| JP | 2002-145920 A | | 5/2002 |
| JP | 2002-206003 A | | 7/2002 |
| JP | 2003-523417 A | | 8/2003 |
| JP | 2005-281688 | | 10/2005 |
| WO | WO-97/33923 A1 | | 9/1997 |

OTHER PUBLICATIONS

Hsieh, H.L., et al, "Effects of Dibutylmagnesium on Alkyllithium-Initiated Polymerizations." Macromolecules, 1986, vol. 19, No. 2, p. 299-304.
Seitz, L. and Little, B.F., "Lithium-7 and Proton Nuclear Magneticresonance Spectra of Methyllithium/Dimethylmagnesium (Zinc, Cadium) in Tetrahydrofuran and Methyllithium/ Dimethylcadmium in Ether." Journal of Organometallic Chemistry, 1969, vol. 18, No. 2, p. 227-241.
Deffieux, A., et al, "Towards the Control of the Reactivity in High Temperature Bulk Anionic Polymerization of Styrene, 1 Influence of n,s-dibutylmagnesium on the Reactivity of Polstyryl-lithium Species." Macromolecular Chemistry and Physics, 1969, vol. 200, No. 3, p. 621-628.
Ebara, Kenji, et al, "Living Anionic Polymerization of Styrene with the $BU_2Mg/BuLi$ Systems," 7th SPSJ International Polymer Conference, Yokohama, Japan, Oct. 26-29, 1999, p. 10.
International Search Report for PCT/JP2005/010485 mailed Sep. 13, 2005.

* cited by examiner

*Primary Examiner*—Ling-Siu Choi
(74) *Attorney, Agent, or Firm*—Oliff & Berridge, PLC

(57) ABSTRACT

An anionic polymerizable monomer is added to a reaction system in which an anion species which is incapable of initiating polymerization but may react with polymerization inhibiting substances to convert them into compounds that do not inhibit polymerization is present, and then an anion species capable of initiating polymerization is added thereto. It becomes possible to produce high molecular weight polymers and to precisely control the molecular weight thereof even if polymerization inhibiting substances are present in the system or when polymerization inhibiting substances enter from outside.

22 Claims, 5 Drawing Sheets

PRODUCTION METHOD OF POLYMERS BY USING LIVING ANIONIC POLYMERIZATION METHOD

CROSS-REFERENCE TO PRIOR APPLICATION

This is a U.S. National Phase Application under 35 U.S.C. §371 of International Patent Application No. PCT/JP2005/010485 filed Jun. 8, 2005, and claims the benefit of Japanese Patent Application Nos. 2004-170963, filed Jun. 9, 2004 and 2004-290963, filed Oct. 4, 2004, all of which are incorporated by reference herein. The International Application was published in Japanese on Dec. 22, 2005 as WO 2005/121189 A1 under PCT Article 21(2).

TECHNICAL FIELD

The present invention relates to a method for producing polymers by using a living anionic polymerization method, and more specifically, relates to a production method of polymers by using a living anionic polymerization method which make it possible to produce polymers having high molecular weights without performing stringent raw-material purification and also to precisely control the molecular weight of the obtained polymers.

BACKGROUND ART

In anionic polymerization systems, since active hydrogen compounds such as water and alcohol, oxygen, or the like become polymerization inhibiting substances, which deactivate the growing terminal anions or initiators, the control of anionic polymerization under the presence of these materials is known to be difficult.

On the other hand, when producing a polymer having a high molecular weight of, for example, several tens of thousands or more by an anionic polymerization method, since the more attempts are made to obtain polymers having high molecular weights, the more the concentration of the growing terminal anion in the polymerization solution reduces, relative effects of polymerization inhibiting substances increase greatly and the growing terminal anion becomes prone to deactivation. For this reason, there has been a problem in that the production of polymers having a desired molecular weight is difficult and yields of targeted polymers are reduced.

In order to solve such problems, a method is proposed where benzylmagnesium bromide, butyllithium, or the like is added to monomers or solvents to be used to react with the polymerization inhibiting substances containing active hydrogen, which are contained in the monomers or the solvents in trace amounts, and the polymerization inhibiting substances are removed from the monomers or the solvents for purification.

In this method, there is a need to add an excessive amount of benzylmagnesium bromide, butyllithium, or the like in order to completely remove the polymerization inhibiting substances. However, since there are also some cases where these reagents function as polymerization inhibitors or polymerization initiators, they must be removed completely from the monomers or solvents before the polymerization. For this reason, there was a practically problem when carrying out anionic polymerization on an industrial scale, since there were some cases where the purification process or the like became complex, and moreover, monomers partially polymerized at the time of purifying the monomers by a distillation method or the like caused a reduction of the purification recovery factor of the monomers.

Moreover, Hsieh et al. reports on the anionic polymerization of styrene or dienes at room temperature by having an ate complex of sec-butyllithium or polystyryl anion and dibutylmagnesium as a polymerization initiator and Sawamoto et al. reports on the styrene bulk polymerization at a polymerization temperature of 120° C. using n-butyllithium/dibutylmagnesium complex. However, even in these examples using dibutylmagnesium, precise control of the molecular weight of a high molecular weight polymer has not been achieved (see Non-patent documents 1 to 4).

[Non-patent document 1] H. L. Hsieh et al., Macromolecules, 1986, 19, 299

[Non-patent document 2] Seitz, L., Little, G. F., J. Organomet. Chem., 1969, 18, 227

[Non-patent document 3] A. Deffieux, et al., Macromol. Chem., 1999, 200, 621

[Non-patent document 4] 7th SPSJ International Polymer conference, 27A13 (1999)

DISCLOSURE OF INVENTION

Problems to be Solved by the Invention

The present invention was made in view of the actual conditions of the above-mentioned conventional technology and its object is to provide a production method of polymers by using a living anionic polymerization method (hereinafter, "polymers produced by a living anionic polymerization method" is abbreviated to "living anionic polymers") which is capable of producing high molecular weight polymers even if polymerization inhibiting substances are present in the system or when polymerization inhibiting substances have entered from outside, and is also capable of precisely controlling the molecular weight of the obtained anionic polymers.

Means for Solving the Problems

The present inventors have intensively studied so as to achieve the above object and found that by adding anionic polymerizable monomers to the polymerization reaction-initiating system where an anion species are present which are capable of initiating polymerization and an anion species which is not capable of initiating polymerization but may react with polymerization inhibiting substances, polymers having a high molecular weight can be produced and precise control of the molecular weight of the obtained anionic polymers becomes possible, and thus the present invention has been completed.

As described above, according to the present invention, production methods of living anionic polymers (1) to (12) described below will be provided.

(1) A production method of living anionic polymers characterized by adding an anionic polymerizable monomer to a reaction system in which an anion species is present which is incapable of initiating polymerization but may react with polymerization inhibiting substances to convert them into compounds that do not inhibit polymerization (allow polymerization); and adding an anion species capable of initiating polymerization to the reaction system to which the anionic polymerizable monomer is added.

(2) A production method of living anionic polymers characterized by adding an anionic polymerizable monomer to a reaction system in which an anion species is present which is incapable of initiating polymerization but may react with polymerization inhibiting substances to convert them into compounds that do not inhibit polymerization; and adding an anion species which is incapable of initiating polymerization but may react with polymerization inhibiting substances to convert them into compounds that do not inhibit polymerization, and an excessive amount of anion species capable of initiating polymerization to the reaction system to which the anionic polymerizable monomer is added.

(3) The production method of living anionic polymers according to (1) or (2) characterized in that the reaction system in which an anion species is present which is incapable of initiating polymerization but may react with polymerization inhibiting substances to convert them into compounds that do not inhibit polymerization, is a reaction system in which an anion species which is incapable of initiating polymerization but may react with polymerization inhibiting substances to convert them into compounds that do not inhibit polymerization is added to the reaction system in which an anion species capable of initiating polymerization is present.

(4) The production method of living anionic polymers according to (1) or (2) characterized in that the reaction system in which anion species is present which is incapable of initiating polymerization but may react with polymerization inhibiting substances to convert them into compounds that do not inhibit polymerization, is a reaction system in which an anion species capable of initiating polymerization is added to the reaction system in which an anion species is present which is incapable of initiating polymerization but may react with polymerization inhibiting substances to convert them into compounds that do not inhibit polymerization.

(5) The production method of living anionic polymers according to any one of (1) to (4) characterized in that an amount of an anion species which is incapable of initiating polymerization but may react with polymerization inhibiting substances to convert them into compounds that do not inhibit polymerization, is 0.5 mol or more relative to 1 mol of an anion species capable of initiating polymerization.

(6) The production method of living anionic polymers according to any one of (1) to (5) further comprising: adding an anionic polymerizable monomer after adding an anion species capable of initiating polymerization (7) The production method of living anionic polymers according to any one of (1) to (5) further comprising: adding a mixed solution of an anionic polymerizable monomer and anion species which is incapable of initiating polymerization but may react with polymerization inhibiting substances to convert them into compounds that do not inhibit polymerization after adding the anion species capable of initiating polymerization.

(8) The production method of living anionic polymers according to any one of (1) to (7) characterized in that a reaction is carried out in a reaction system in which an anion species which is incapable of initiating polymerization but may react with polymerization inhibiting substances to convert them into compounds that do not inhibit polymerization is present after removing polymerization inhibiting substances in a polymerization solvent in advance using an anion species capable of initiating polymerization.

(9) The production method of living anionic polymers according to any one of (1) to (8) characterized in that the polymerization inhibiting substances are active hydrogen compounds.

(10) The production method of living anionic polymers according to any one of (1) to (9) characterized in that the anion species which is incapable of initiating polymerization but may react with polymerization inhibiting substances to convert them into compounds that do not inhibit polymerization is a triphenylmethyl anion derivative; an enolate anion; a metal alkoxide anion; an organic anion of an organic metal, which has magnesium, aluminum, or zinc as the metal species; or an organic anion of an ate complex formed from an organic alkali metal and an organic metal, which has magnesium, aluminum, or zinc as the metal species.

(11) The production method of living anionic polymers according to any one of (1) to (10) characterized in that the anion species capable of initiating polymerization is a carbon anion derived from organic alkali metals, organic alkaline-earth metals, 1,1-diphenylethylene, or stilbene; or an organic anion of an ate complex, which has a carbon anion derived from 1,1-diphenylethylene or stilbene as one of the organometallic compounds of the pair forming the complex.

(12) The production method of living anionic polymers according to any one of (1) to (11) characterized in that the anionic polymerizable monomer is at least one selected from the group consisting of styrene derivatives, butadiene derivatives, and (meth)acrylate derivatives.

EFFECTS OF THE INVENTION

By using the production method of the present invention, it is possible to produce high molecular weight polymers while controlling the molecular weights thereof even if anionic polymerizable monomers or solvents which contain trace amounts of polymerization inhibiting substances are used. In other words, it is possible to produce targeted living anionic polymers in which the molecular weights are controlled with a high yield even if living anionic polymers are produced on an industrial scale or when anionic polymerizable monomers or solvents to be used contain trace amounts of polymerization inhibiting substances.

Living anionic polymers obtained by the production method of the present invention, especially high molecular weight block anionic copolymers have microstructures which are controlled to a higher order and are useful as materials for nanopattern formation.

BEST MODE FOR CARRYING OUT THE INVENTION

Figure 1:
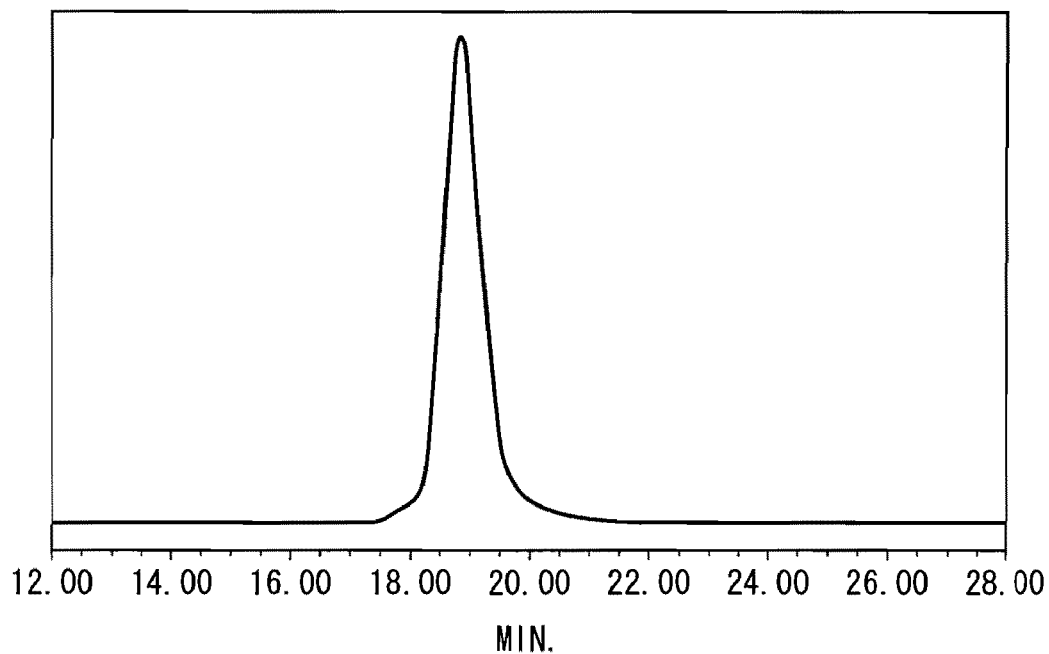
FIG. 1 shows a GPC curve of copolymer A obtained in Example 1.

The anion species having the capability of initiating polymerization used in the present invention is not particularly limited as long as it is an anion species which has the capability of polymerizing the anionic polymerizable unsaturated bonds.

For example, the above anion species may be an anion species obtained by reacting a compound (which is not anionic-polymerizable but convertible to an anion species having the capability of initiating polymerization by reacting with an anion species having the capability of initiating polymerization) with an anion species having the capability of initiating polymerization; or an anion species obtained by reacting one (which is obtained by reacting a compound (which is not anionic-polymerizable but convertible to an anion species having the capability of initiating polymerization by reacting with an anion species having the capability of initiating polymerization) with an excessive amount of an anion species having the capability of initiating polymerization), with an anion species (which is incapable of initiating polymerization but convertible to a compound which does not inhibit polymerization by reacting with polymerization inhibiting substances), of an equivalent amount or more relative to that of the anion species having the capability of initiating polymerization.

Examples of the above-mentioned anion species having the capability of initiating polymerization include carbon anions derived from organic alkali metals, organic alkaline earth metals, 1,1-diphenylethylene, or stilbene; and organic anions of an ate complex which has carbon anions derived from 1,1-diphenylethylene or stilbene as one of the organometallic compounds of the pair forming the complex.

Specific examples of the above-mentioned carbon anions include carbon anions derived from ethyllithium, n-butyllithium, sec-butyllithium, t-butyllithium, ethylsodium, lithium biphenyl, lithium naphthalene, sodium naphthalene, potassium naphthalene, α-methylstyrenenaphthalenedianion, 1,1-diphenylhexyllithium, 1,1-diphenyl-3-methylpentyllithium, 1,4-dilithio-2-butene, 1,6-dilithiohexane, polystyryllithium, cumyl potassium, cumyl cesium, 1,1-diphenylethylene, or stilbene.

Specific examples of the above-mentioned ate complex of an anion species having the capability of initiating polymerization include ate complexes which have carbon anions derived from 1,1-diphenylethylene or stilbene as one of the organometallic compounds of the pair forming the complex, and more specifically, an ate complex formed by 1,1-diphenylhexyllithium, which is formed by the reaction between 1,1-diphenylethylene and n-butyllithium, and dibutylmagnesium, or an ate complex formed by 1,1-diphenylhexyllithium and diethylzinc.

The other organometallic compounds of the pair forming ate complexes are not particularly limited as long as they can form ate complexes with anions having the capability of initiating polymerization. Specific examples thereof include organic metals which have magnesium, aluminum, or zinc as metal species.

The anion species having the capability of initiating polymerization listed above can be used alone or as a mixture of two or more kinds.

The anion species which does not have the capability of initiating polymerization but react with polymerization inhibiting substances to convert them into compounds that do not inhibit polymerization, used in the present invention (hereinafter, the anion species may be referred to as the "anion species incapable of initiating polymerization") is not particularly limited as long as it is an anion species which does not having the capability of polymerizing the anionic polymerizable unsaturated bonds but which may react with polymerization inhibiting substances represented by active hydrogen compounds to convert them into compounds that do not inhibit polymerization.

Specific examples of anion species incapable of initiating polymerization include triphenylmethyl anion derivatives; enolate anions; metal alkoxide anions; organic anions of organic metals which have magnesium, aluminum, or zinc as metal species; and organic anions of ate complexes formed from organic alkali metals and organic metals which have magnesium, aluminum, or zinc as metal species.

Triphenylmethyl anion derivatives can be prepared by, for example, reacting triphenylmethane derivatives with alkyllithium.

Enolate anions can be prepared by reacting (meth)acrylates which have an ester functional group with a relatively lower steric hindrance, such as methyl, ethyl, and n-propyl and anion species such as alkyllithium.

Moreover, metal alkoxides can be prepared by reacting alcohols with alkyllithium. Specific examples thereof include lithium methoxyethoxide formed by the reaction of methoxyethanol and n-butyllithium.

Examples of organic metals having magnesium, aluminum, or zinc as metal species include compounds of magnesium, aluminum, or zinc which have, for example, $C_{1-20}$ alkyl or $C_{6-20}$ aryl as a substituent on the metal atom.

Examples of the abovementioned $C_{1-20}$ alkyl and $C_{6-20}$ aryl include methyl, ethyl, n-propyl, isopropyl, n-butyl, sec-butyl, t-butyl, isobutyl, amyl, hexyl, benzyl, phenyl, and naphthyl.

Specific examples of organic metals having magnesium, aluminum, or zinc as metal species include di-n-butylmagnesium, di-t-butylmagnesium, di-sec-butylmagnesium, n-butyl-sec-butylmagnesium, n-butyl-ethylmagnesium, di-n-amylmagnesium, dibenzylmagnesium, diphenylmagnesium, diethylzinc, di-n-butylzinc, trimethylaluminum, triethylaluminum, triisobutylaluminum, and tri-n-hexylaluminum.

Examples of the above-mentioned organic alkali metals forming ate complexes of anion species incapable of initiating polymerization include the same organic alkali metals as those shown as examples of the anion species capable of initiating polymerization.

Moreover, examples of organic metals which form ate complexes and which have magnesium, aluminum, or zinc as the metal species include the same compounds as those shown as examples previously. Specific examples thereof include an ate complex of n-butyllithium and dibutylmagnesium or an ate complex of n-butyllithium and diethylzinc.

The anion species incapable of initiating polymerization shown as examples above can be used alone or as a mixture of two or more kinds.

The production method of the present invention is characterized by adding an anion species capable of initiating polymerization to the reaction system in which an anion species incapable of initiating polymerization and anionic polymerizable monomers coexist.

When the above-mentioned anion species incapable of initiating polymerization is converted into compounds which do not inhibit polymerization by rapidly reacting with the polymerization inhibiting substances in the reaction system, polymerization reaction is carried out stably without deactivating the polymerization terminal anion having relatively low concentration. The anion species itself is not involved in the polymerization reaction. Accordingly, it is possible to highly control the structures of the obtained polymers since the molecular weight thereof is determined solely by the anion species capable of initiating polymerization.

Although the ratio between the amount of anion species capable of initiating polymerization and that of anion species incapable of initiating polymerization can be set arbitrarily, it is preferable that anion species incapable of initiating polymerization be equivalent or in excess compared to anion species capable of initiating polymerization in molar ratio in order to carry out the polymerization reaction more effectively.

Although it depends on the amount of polymerization inhibiting substances present or which may be present in the reaction system, when the amount of anion species incapable of initiating polymerization is considerably lower than that of anion species capable of initiating polymerization, there is a possibility that the function of the anion species incapable of initiating polymerization as an agent to remove polymerization inhibiting substances is not sufficiently achieved.

In addition, it is better to increase the ratio between the amount of anion species incapable of initiating polymerization and that of anion species capable of initiating polymerization as the molecular weights of polymers to be produced increase and it is preferable that the ratio be 1 or more when producing polymers which have molecular weights of 20,000 to 30,000 or more (in other words, making the amount of anion species incapable of initiating polymerization higher than that of anion species capable of initiating polymerization).

Specifically, although it changes depending on the monomers used, the amount of anion species incapable of initiating polymerization is 0.3 mol or more, preferably 0.5 mol or more, more preferably 0.5 to 50 mol, still more preferably 0.5 to 20 mol, and particularly preferably 1 to 10 mol relative to 1 mol of anion species capable of initiating polymerization.

When the amount of anion species incapable of initiating polymerization is less than 0.3 mol relative to 1 mol of anion species capable of initiating polymerization, there is a problem in that reliable and highly-reproducible production of high molecular-weight polymers in which the molecular weight is controlled is not possible. On the other hand, when the amount of anion species incapable of initiating polymerization is more than 50 mol, there is a problem of reduced growth rate in the polymerization reaction.

Although anionic polymerizable monomers used in the present invention are not particularly limited as long as they have anionic polymerizable unsaturated bonds, specific and preferable examples thereof include styrene derivatives, butadiene derivatives, and (meth)acrylate derivatives.

Specific examples of styrene derivatives include styrene, α-alkyl styrene, and nuclear-substituted styrene.

The nuclear substituents are not particularly limited as long as they are groups inert towards anion species capable of initiating polymerization and anion species incapable of initiating polymerization. Specific examples thereof include alkyl, alkoxyalkyl, alkoxy, alkoxyalkoxy, t-butoxycarbonyl, t-butoxycarbonylmethyl, and tetrahydropyranyl.

Examples of α-alkylstyrenes and nuclear-substituted styrenes include α-methylstyrene, α-methyl-p-methylstyrene, p-methylstyrene, m-methylstyrene, o-methylstyrene, p-ethylstyrene, 2,4-dimethylstyrene, 2,5-dimethylstyrene, p-isopropylstyrene, 2,4,6-triisopropylstyrene, p-t-butoxystyrene, p-t-butoxy-α-methylstyrene, and m-t-butoxystyrene.

Examples of butadiene derivatives include 1,3-butadiene, isoprene, 2,3-dimethylbutadiene, 2-ethyl-1,3-butadiene, and 1,3-pentadiene.

In view of reactivity, it is preferable that (meth)acrylate derivatives contain the ester alcohol residue having 1 to 20 carbon atoms. Examples of such (meth)acrylate derivatives include methyl ester, ethyl ester, isopropyl ester, and n-butyl ester.

These monomers can be used alone or as a mixture of two or more kinds.

The production method of the present invention is also applicable in the production of copolymers such as block copolymers and random copolymers.

Although the polymerization temperature of the anionic polymerizable monomer is not particularly limited as long as side reactions such as transfer reactions and termination reactions do not occur and it is within a temperature range in which the monomer is consumed and polymerization is completed, it is preferable that polymerization be carried out within a temperature range of −100° C. or higher and 20° C. or lower.

The polymerization reaction of anionic polymerizable monomers can be carried out in an appropriate polymerization solvent. The polymerization solvent to be used is not particularly limited as long as it is a polar solvent which is not involved in the polymerization reaction and is also compatible with the polymers used.

Specific examples thereof include ether compounds such as diethyl ether, tetrahydrofuran (THF), dioxane, and trioxane; and tertiary amines such as tetraethylenediamine and hexamethylphosphoric triamide. These solvents can be used alone or as mixed solvents of two or more kinds. Among them, ether compounds having low polarity are preferable and THF is particularly preferable.

When aliphatic, aromatic, or alicyclic hydrocarbon compounds having low polarity are relatively compatible with the polymers used, the compounds can be used by combining with polar solvents. For example, mixed solvents of ether compounds and aliphatic hydrocarbon compounds, mixed solvents of ether compounds and alicyclic hydrocarbon compounds, or mixed solvents of ether compounds and aromatic hydrocarbon compounds can be used. Specific examples of the combinations include the combination of hexane and THF, the combination of cyclohexane and THF, or the combination of toluene and THF.

Although the amount of solvents used is not particularly limited, it is usually an amount in which the concentration of anionic polymerizable monomers relative to polymerization solvent is within a range of 1 to 40% by weight, preferably an amount in which the range is within 2 to 5% by weight.

In the present invention, it is possible to add additives where necessary when initiating polymerization or during polymerization.

Examples of additives to be used include alkali metal mineral acid salts such as sulfate salts, nitrate salts, and borate salts of sodium, potassium, or the like; alkaline earth metal mineral acid salts such as sulfate salts, nitrate salts, and borate salts of barium, magnesium, or the like; halides of alkali metals such as sodium and potassium; and halides of alkaline earth metals such as barium and magnesium.

More specific examples include chlorides, bromides, and iodides of lithium or barium; lithium borate; magnesium nitrate; sodium chloride; and potassium chloride. Among them, it is preferable to use halides of lithium, for example, lithium chloride, lithium bromide, lithium iodide, or lithium fluoride, and in particular, lithium chloride.

Moreover, in order to regulate more precisely the molecular weight of the polymer to be obtained, a certain amount of monomer is polymerized and then the molecular weight thereof is measured using a gel permeation chromatograph (GPC) to determine the state of progress in the polymerization reaction. Furthermore, monomers required to achieve the desired molecular weight of the polymers are added in the polymerization reaction system and a multi-step polymerization which controls the molecular weight is used, so that it is possible to further precisely regulate the molecular weight. It is preferable to add an anion species incapable of initiating polymerization to the monomers to be added when carrying out multi-step polymerization or producing block copolymers.

In the present invention, as a pretreatment of the polymerization reaction, polymerization inhibiting substances in the polymerization solvent can be removed in advance using an anion species capable of initiating polymerization.

Examples of an anion species capable of initiating polymerization include the same compounds shown previously as examples. Among them, organic alkali metals are particularly preferable and alkyllithiums such as n-butyllithium and sec-butyllithium are more preferable.

Although the method of removing the polymerization inhibiting substances in the polymerization solvent in advance using an anion species capable of initiating polymerization is not particularly limited, specific examples thereof include the methods shown below.

(1) A method of adding an excessive amount of organic alkali metals compared to that of polymerization inhibiting substances to the polymerization solvent at a temperature which is −10° C. or higher and lower than the boiling temperature of the polymerization solvent, and then setting the temperature of the polymerization solvent to the polymerization temperature after the polymerization activity of the organic alkali metals has completely dissipated.

(2) A method of adding an excessive amount of organic alkali metals compared to that of polymerization inhibiting substances to the polymerization solvent and stirring at a temperature which is −10° C. or higher and lower than the boiling temperature of the polymerization solvent, and thereafter setting the temperature of polymerization solvent to the polymerization temperature to inactivate the remaining organic alkali metals using organic metals. Examples of the organic metals used here include the same organic metals as those shown as examples previously and having magnesium, aluminum, or zinc as organic species. The stirring time is preferably 5 minutes or longer.

These methods can be used particularly preferably when using polymerization solvents formed from ether compounds and aromatic hydrocarbon compounds since it is possible to visually identify the presence/absence of polymerization-initiating capability of anion species capable of initiating polymerization from the coloring easily.

By the production method of the present invention, it becomes possible to remove substances inhibiting living anionic polymerization, for example, compounds containing active hydrogen such as water, in the polymerization system.

Accordingly, (a) it becomes possible to carry out living anionic polymerization even if using compounds which are difficult to subject to purification such as distillation, as monomers, and additionally, (b) it becomes easy to regulate the molecular weight of the polymers since the deactivation of anion species capable of initiating polymerization is suppressed. Furthermore, (c) it is possible to efficiently carry out living anionic polymerization even in the production of high molecular-weight polymers where it is usually considered to be difficult to carry out living anionic polymerization, since the deactivation of growing terminal anions is suppressed.

In addition, when organic metals having magnesium, aluminum, or zinc as metal species are used, (d) it becomes possible to carry out further-controlled living anionic polymerization since organic metals stabilize by coordinated to the growing terminal anions, and additionally, (e) when ate complexes formed of anion species derived from 1,1-diphenylethylene or stilbene and organic metals such as dibutylmagnesium are used as anion species capable of initiating polymerization, it is possible to obtain polymers where the molecular weights thereof are precisely controlled even further since the regulation of the amount of this anion species becomes easy.

Among the polymers obtained from the production method of the present invention, multi-block copolymers produced from the combination of different monomers are favorably used as polymers for materials of self-assembling nano patterns where precise microphase separation is required.

In particular, the multi-block copolymers of nonpolar monomers such as styrene, vinylnaphthalene, or butadiene and monomers which protect polar monomers such as acetal-protected monomers of p-t-butoxystyrene, t-butylmethacrylate, and 2-hydroxyethylmethacrylate or monomers which have functional groups such as glycidyl methacrylate are favorable. Polymers having protecting groups can be changed to derivatives by removing the protecting group.

Examples of the polymers which can be obtained from the production method of the present invention include the polymers below:

(1) polymers characterized by having a repeating unit represented by formula (I) and having a weight-average molecular weight of 100,000 or more, preferably 200,000 or more, more preferably 300,000 or more; and (2) polymers characterized by having a repeating unit represented by formula (I), having a weight-average molecular weight of 50,000 or more, and also having a degree of molecular dispersion (weight-average molecular weight/number-average molecular weight) of 1.01 to 2.50.

Polymers having an upper limit weight-average molecular weight of ten million can be also synthesized.

[Chemical Formula 1]

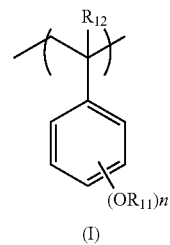

(I)

in the formula, $R_{11}$ represents hydrogen or a monovalent organic group, $R_{12}$ represents hydrogen or $C_{1-4}$ alkyl, and n represents an integer of 1 to 3.

A monovalent organic group of $R_{11}$ is preferably a protecting group and particularly preferably an acid-decomposable leaving group and a decomposition residue formed by decomposing the acid-decomposable leaving group by acid.

The protecting group of $R_{11}$ includes $C_{1-6}$ alkyl such as methyl and specific examples of acid-decomposable leaving groups include $C_{1-4}$ alkoxy-$C_{1-4}$ alkyl such as methoxymethyl and 2-ethoxyethyl; $C_{1-4}$ alkoxy-$C_{1-4}$ alkoxy-$C_{1-4}$ alkyl such as 2-methoxyethoxymethyl; tri-$C_{1-4}$ alkylmethyl such as t-butyl; bis(2-chloroethoxy)methyl; tetrahydropyranyl; 4-methoxytetrahydropyranyl; tetrahydrofuranyl; triphenylmethyl; trimethylsilyl; 2-(trimethylsilyl)ethoxymethyl; t-butyldimethylsilyl; trimethylsilylmethyl; and the group represented by the formula below:

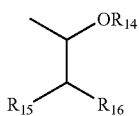

[Chemical Formula 2]

in the formula, $R_{14}$ represents unsubstituted or alkoxy-substituted $C_{1-20}$ alkyl, $C_{5-10}$ cycloalkyl, or unsubstituted or alkoxy-substituted $C_{6-20}$ aryl; $R_{15}$ represents hydrogen or $C_{1-3}$ alkyl; $R_{16}$ represents hydrogen, $C_{1-6}$ alkyl, or $C_{1-6}$ alkoxy. Specific examples of such substituents include 1-methoxyethyl, 1-ethoxyethyl, 1-methoxypropyl, 1-methyl-1-methoxyethyl, and 1-(isopropoxy)ethyl.

Examples of $C_{1-4}$ alkyl of $R_{12}$ include methyl and ethyl.

Although the present invention will be described in detail below using Examples, the scope of the present invention is not limited to these Examples.

In Examples, GPC was measured using a GPC system manufactured by Waters Corporation. Two columns, KF-805L and KF-804L, were combined for use. THF was used as a solvent and GPC was measured at 40° C. with a flow rate of 1.0 ml/min. Molecular weights were determined from a calibration curve using polystyrene standards.

Example 1

After adding 2.56 g (3.67 mmol) of a dibutyl magnesium solution (DBuMg) to 570 g of THF under a nitrogen atmosphere at −40° C., 29.8 g (286.1 mmol) of styrene was added thereto and the resulting mixture was stirred for 10 minutes. 1.15 g (2.76 mmol) of n-BuLi solution was added to the resulting solution and the entire mixture was stirred at −40° C. for 30 minutes. 11.2 g (63.7 mmol) of p-t-butoxystyrene (PTBST) was then added to this reaction solution and further stirred at −40° C. for 90 minutes. After stopping the reaction by adding methanol to the obtained reaction mixture, the resulting mixture was subjected to a reprecipitation process using a methanol solvent to obtain a reprecipitate, then the reprecipitate was filtered to obtain the retained matter, and the retained matter was air-dried to obtain styrene-PTBST copolymer A (yield 99%). The Mw of the copolymer A was 219,500 and the ratio Mw/Mn was 1.15.

The GPC curve of copolymer A is shown in FIG. 1. The horizontal axis represents retention time (min) (the same applies hereinafter).

The obtained copolymer A was dissolved in an ethanol/toluene solvent (volume ratio 7:3) and was then reacted using sulfuric acid at 65° C. for 90 minutes. After washing this reaction solution with an alkaline solution, the resulting solution was subjected to a reprecipitation process using a methanol/water (volume ratio 1:1) solvent to obtain a reprecipitate, then the reprecipitate was filtered to obtain the retained matter, and the retained matter was air-dried to obtain styrene-p-hydroxystyrene (PHS) copolymer B (yield 87%). The Mw of copolymer B was 216,300 and the ratio Mw/Mn was 1.15.

Figure 2:
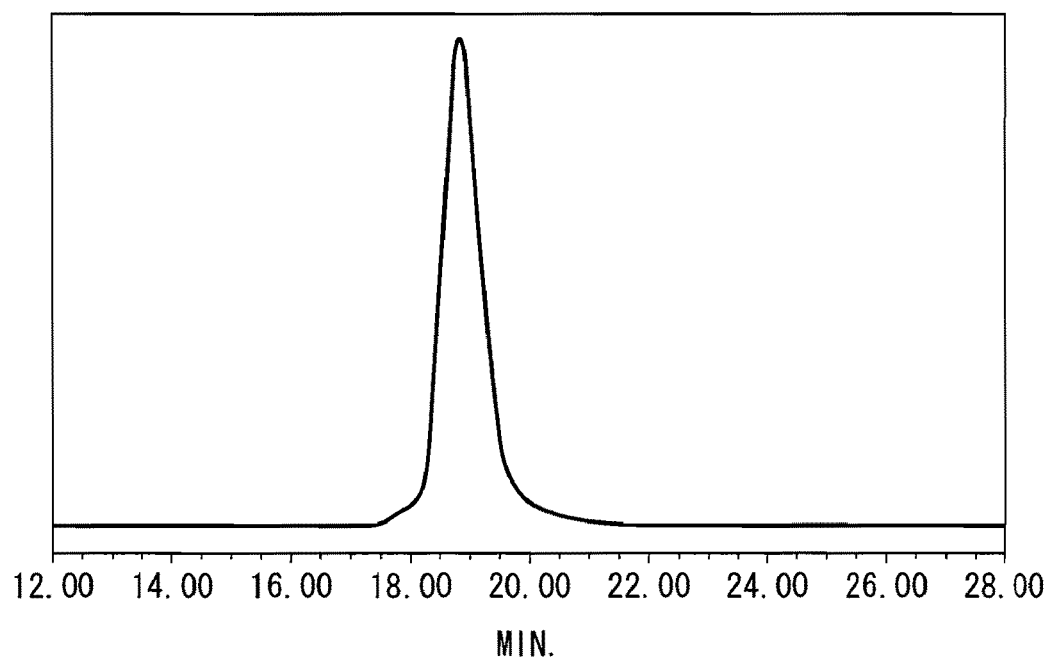
FIG. 2 shows a GPC curve of copolymer B obtained in Example 1.

The GPC curve of this copolymer B is shown in FIG. 2.

Example 2

After adding 2.46 g (3.46 mmol) of a dibutyl magnesium solution (DBuMg) to 570 g of THF under a nitrogen atmosphere at −40° C., 32.7 g (314.0 mmol) of styrene was added thereto and the resulting solution was stirred for 15 minutes. 1.01 g (2.42 mmol) of n-BuLi solution was added to this solution and the resultant solution was stirred at −40° C. for 30 minutes. A mixed solution of 0.40 g (0.56 mmol) of DBuMg and 12.7 g (72.1 mmol) of p-t-butoxystyrene (PTBST) was then added to this reaction solution and the resulting solution was further stirred at −40° C. for 90 minutes. After stopping the reaction by adding methanol to the obtained reaction mixture, the resulting mixture was subjected to a reprecipitation process using a methanol solvent to obtain a reprecipitate, then the reprecipitate was filtered to obtain the retained matter, and the retained matter was air-dried to obtain styrene-PTBST copolymer C (yield 99%). The Mw of the copolymer C was 335,550 and the ratio Mw/Mn was 1.17.

Figure 3:
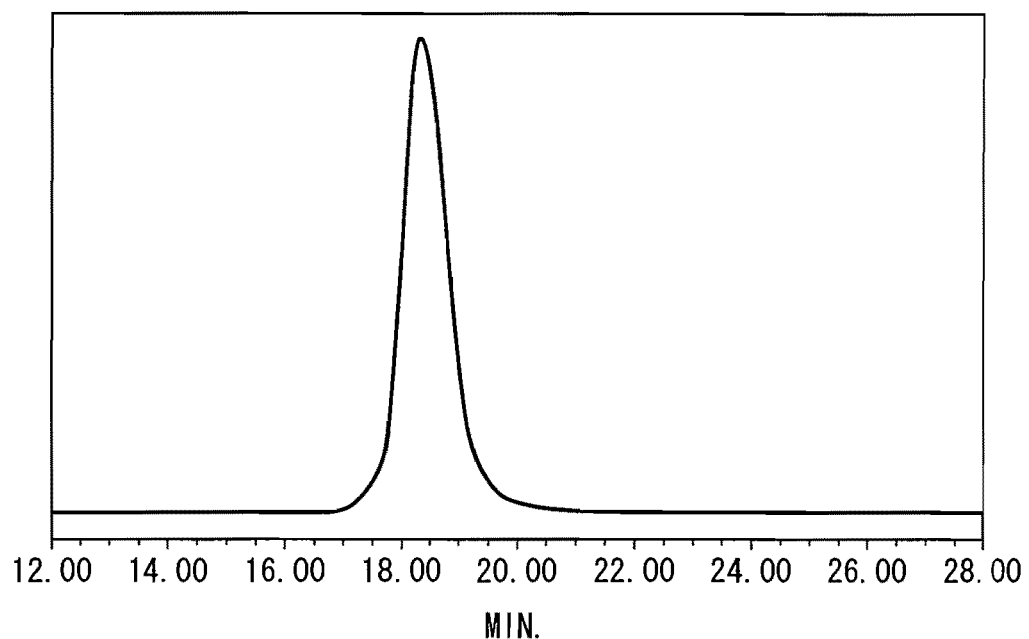
FIG. 3 shows a GPC curve of copolymer C obtained in Example 2.

The GPC curve of this copolymer C is shown in FIG. 3.

Example 3

After adding 3.80 g (5.35 mmol) of a dibutyl magnesium solution (DBuMg) to 570 g of THF under a nitrogen atmosphere at −40° C., 30.8 g (297.6 mmol) of styrene was added thereto and the resulting solution was stirred for 10 minutes. 1.02 g (2.45 mmol) of n-BuLi solution was added to the solution and the resultant solution was stirred at −40° C. for 30 minutes. 6.43 g (33.4 mmol) of 4-(2-ethoxy-ethoxystyrene) (PEES) was then added to this reaction solution and the resulting solution was further stirred at −40° C. for 3 hours. After stopping the reaction by adding methanol to the obtained reaction mixture, the resulting mixture was subjected to a reprecipitation process using a methanol solvent to obtain a reprecipitate, then the reprecipitate was filtered to obtain the retained matter, and the retained matter was air-dried to obtain St-PEES copolymer D (yield 99%). The Mw of the copolymer D was 282,000 and the ratio Mw/Mn was 1.19.

Figure 4:
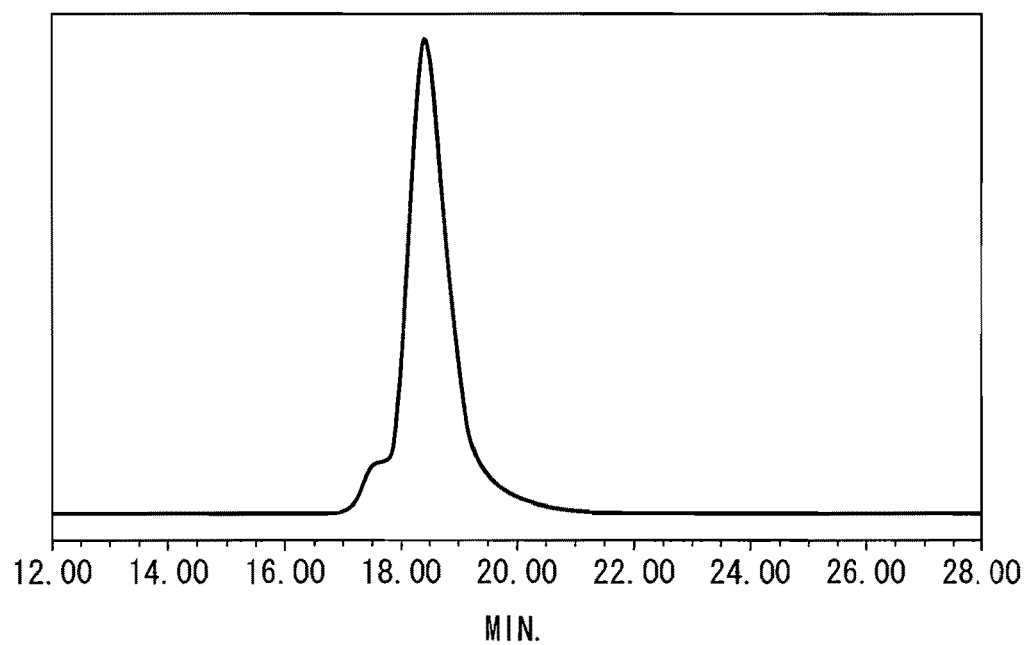
FIG. 4 shows a GPC curve of copolymer D obtained in Example 3.

The GPC curve of this copolymer D is shown in FIG. 4.

The obtained copolymer D was dissolved in a THF solvent and was then reacted using hydrochloric acid at room temperature for 90 minutes. After washing this reaction solution with an alkaline solution, the resulting solution was subjected to a reprecipitation process using a methanol/water (volume ratio 1:1) solvent to obtain a reprecipitate, then the reprecipitate was filtered to obtain the retained matter, and the retained matter was air-dried to obtain styrene-PHS copolymer E (yield 98%). The Mw of the copolymer E was 233,300 and the ratio Mw/Mn was 1.18.

Example 4

After adding 4.06 g (5.71 mmol) of a dibutyl magnesium solution (DBuMg) to 570 g of THF under a nitrogen atmosphere at −40° C., 33.1 g (188.0 mmol) of p-t-butoxystyrene was added thereto and the resulting solution was stirred for 10 minutes. 1.59 g (3.81 mmol) of n-BuLi solution was added to this solution and the resultant solution was stirred at −40° C. for 60 minutes. 9.34 g (48.6 mmol) of 4-(2-ethoxy-ethoxystyrene) (PEES) was then added to this reaction solution and the resulting solution was further stirred at −40° C. for 90 minutes. After stopping the reaction by adding methanol to the obtained reaction mixture, the resulting mixture was subjected to a reprecipitation process using a methanol solvent to obtain a reprecipitate, then the reprecipitate was filtered to obtain the retained matter, and the retained matter was air-dried to obtain PTBST-PEES copolymer F (yield 98%). The Mw of the copolymer F was 217,900 and the ratio Mw/Mn was 1.32.

Figure 5:
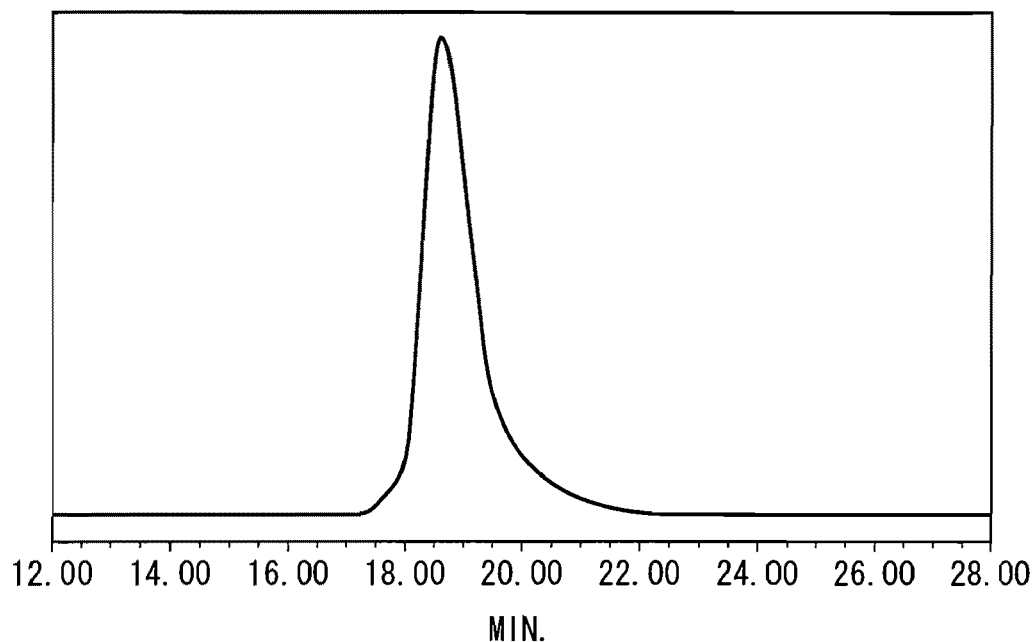
FIG. 5 shows a GPC curve of copolymer F obtained in Example 4.

The GPC curve of this copolymer F is shown in FIG. 5.

The obtained copolymer F was dissolved in a THF solvent and was then reacted using hydrochloric acid at room temperature for 150 minutes. After washing the reaction solution with an alkaline solution, the resulting solution was subjected to a reprecipitation process using a methanol/water (volume ratio 1:1) solvent to obtain a reprecipitate, then the reprecipitate was filtered to obtain the retained matter, and the retained matter was air-dried to obtain PTBST-PHS copolymer G (yield 79%). The Mw of the copolymer G was 213,000 and the ratio Mw/Mn was 1.27.

Example 5

After adding 1.43 g (3.43 mmol) of an n-BuLi solution and 2.29 g (3.15 mmol) of diethyl zinc solution (DEtZn) to 570 g of THF under a nitrogen atmosphere at −40° C., 33.6 g (322.6 mmol) of styrene was added thereto and the resulting solution was stirred for 10 minutes. 0.51 g (1.22 mmol) of n-BuLi solution was added to the solution and the resultant solution was stirred at −40° C. for 30 minutes. 0.45 g (2.5 mmol) of 1,1-diphenylethylene, 0.31 g (7.29 mmol) of lithium chloride, and 7.71 g (78.4 mmol) of methyl methacrylate (MMA) were then added to this reaction solution and the resulting solution was further stirred at −40° C. for 90 minutes. After stopping the reaction by adding methanol to the obtained reaction mixture, the resulting mixture was subjected to a reprecipitation process using a methanol solvent to obtain a reprecipitate, then the reprecipitate was filtered to obtain the retained matter, and the retained matter was air-dried to obtain styrene-MMA copolymer H (yield 99%). The Mw of the copolymer H was 39,600 and the ratio Mw/Mn was 1.04.

Figure 6:
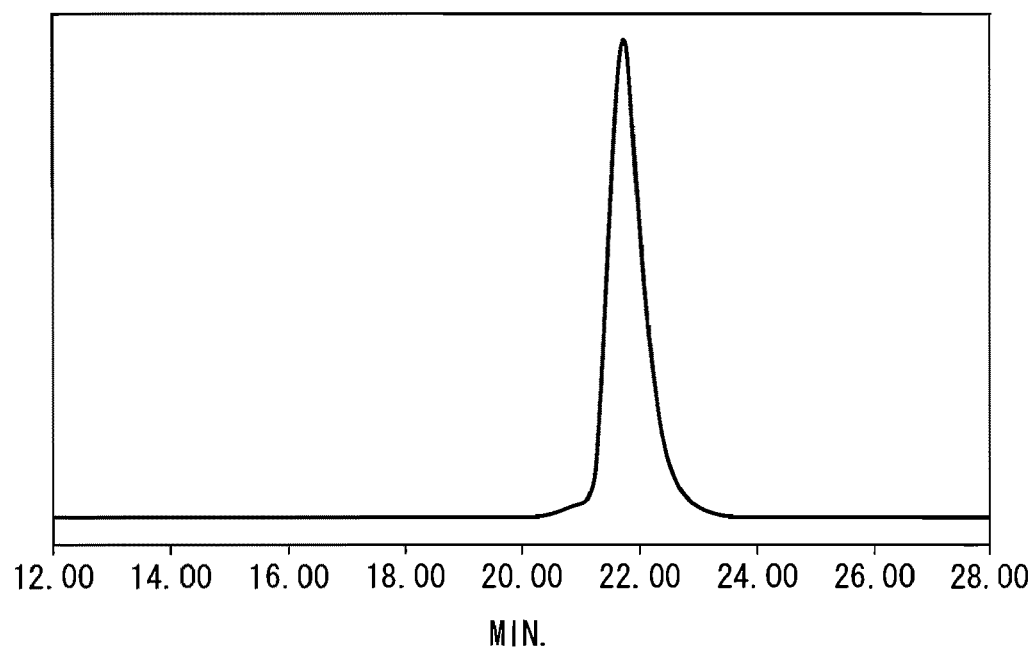
FIG. 6 shows a GPC curve of copolymer H obtained in Example 5.

The GPC curve of this copolymer H is shown in FIG. 6.

Example 6

10.8 g (26.0 mmol) of an n-BuLi solution and 6.1 g (31.7 mmol) of PEES were added to 52.9 g of THF under a nitrogen atmosphere at −40° C. and stirred at −40° C. for 30 minutes to prepare a polymerization initiating species. Separate to this, after adding 3.41 g (4.8 mmol) of a dibutyl magnesium solution (DBuMg) to 583 g of THF under a nitrogen atmosphere at −40° C. and stirring the resulting solution for 10 minutes, 27.8 g (27.5 mmol) of 4-(2-ethoxy-ethoxystyrene) (PEES) was added thereto. 3.17 g (1.17 mmol) of the polymerization initiating species prepared previously was added to the solution and the resultant solution was stirred at −40° C. for 30 minutes. After stopping the reaction by adding methanol to the obtained reaction mixture, the resulting mixture was subjected to a reprecipitation process using a methanol solvent to obtain a reprecipitate, then the reprecipitate was filtered to obtain the retained matter, and the retained matter was air-dried to obtain PEES-styrene copolymer I (yield 98%). The Mw of the copolymer I was 51,400 and the ratio Mw/Mn was 1.07.

Figure 7:
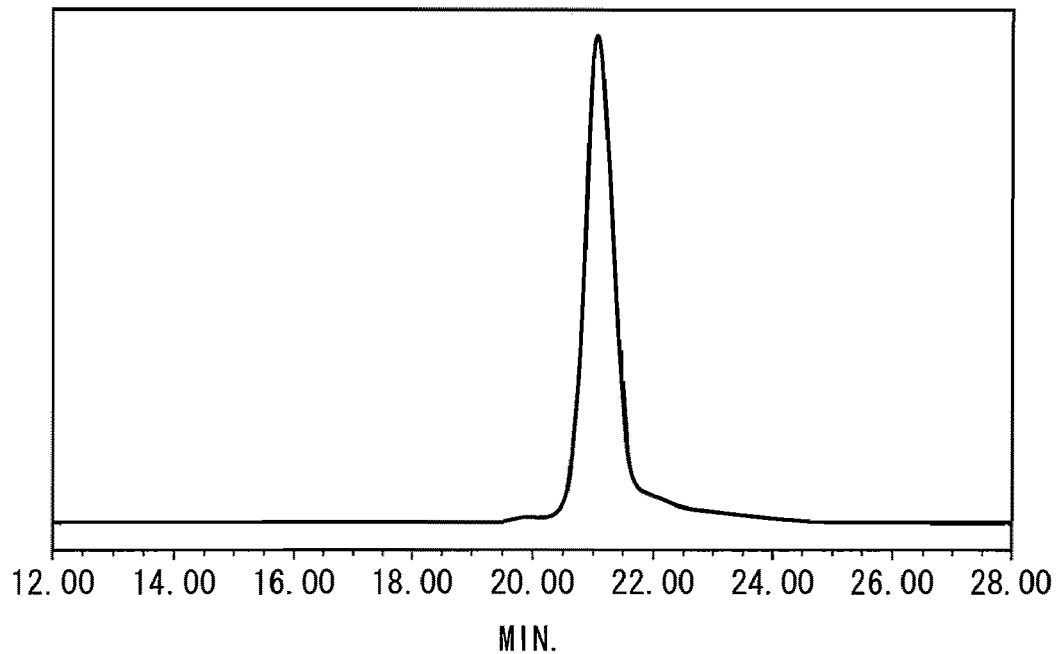
FIG. 7 shows a GPC curve of copolymer I obtained in Example 6.

The GPC curve of this copolymer I is shown in FIG. 7.

Example 7

3.84 g (9.21 mmol) of an n-BuLi solution was added to 631.8 g of THF under a nitrogen atmosphere at room temperature and the resulting solution was stirred for 30 minutes. After cooling the solution to −40° C., 3.59 g (5.05 mmol) of dibutyl magnesium and 16.6 g (159.1 mmol) of styrene were added thereto. 2.17 g (5.21 mmol) of n-BuLi solution was added to the resultant solution and the mixture was stirred at −40° C. for 30 minutes. After stopping the reaction by adding methanol to the obtained reaction mixture, the resulting mixture was subjected to a reprecipitation process using a methanol solvent to obtain a reprecipitate, then the reprecipitate was filtered to obtain the retained matter, and the retained matter was air-dried to obtain styrene polymer J (yield 98%). The Mw of the polymer J was 348,600 and the ratio Mw/Mn was 1.23.

Figure 8:
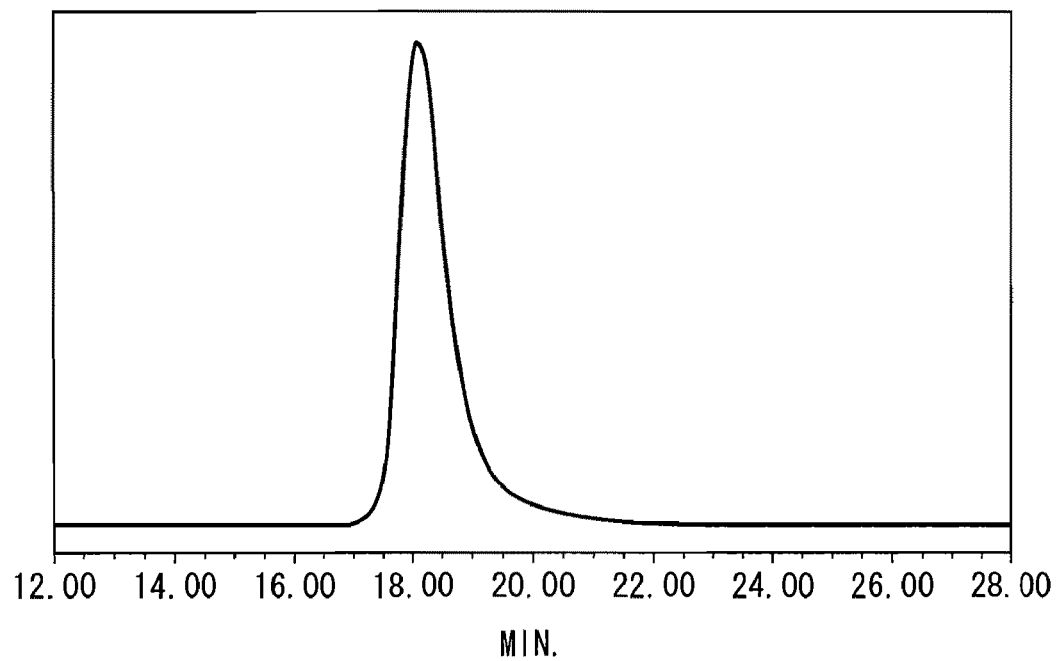
FIG. 8 shows a GPC curve of copolymer J obtained in Example 7.

The GPC curve of this polymer J is shown in FIG. 8.

Example 8

3.56 g (8.54 mmol) of an n-BuLi solution was added to 611.9 g of THF under a nitrogen atmosphere at room temperature and the resulting solution was stirred until the color of the anion disappeared completely. After cooling the solution to −40° C., 2.37 g (3.15 mmol) of a diethyl zinc solution (DEtZn) and 15.5 g (148.5 mmol) of styrene were added thereto. 1.58 g (3.79 mmol) of an n-BuLi solution was added to the resultant solution and the mixture was stirred at −40° C. for 30 minutes. After stopping the reaction by adding methanol to the obtained reaction mixture, the resulting mixture was subjected to a reprecipitation process using a methanol solvent to obtain a reprecipitate, then the reprecipitate was filtered to obtain the retained matter, and the retained matter was air-dried to obtain styrene polymer K (yield 98%). The Mw of the polymer K was 76,900 and the ratio Mw/Mn was 1.04.

Figure 9:
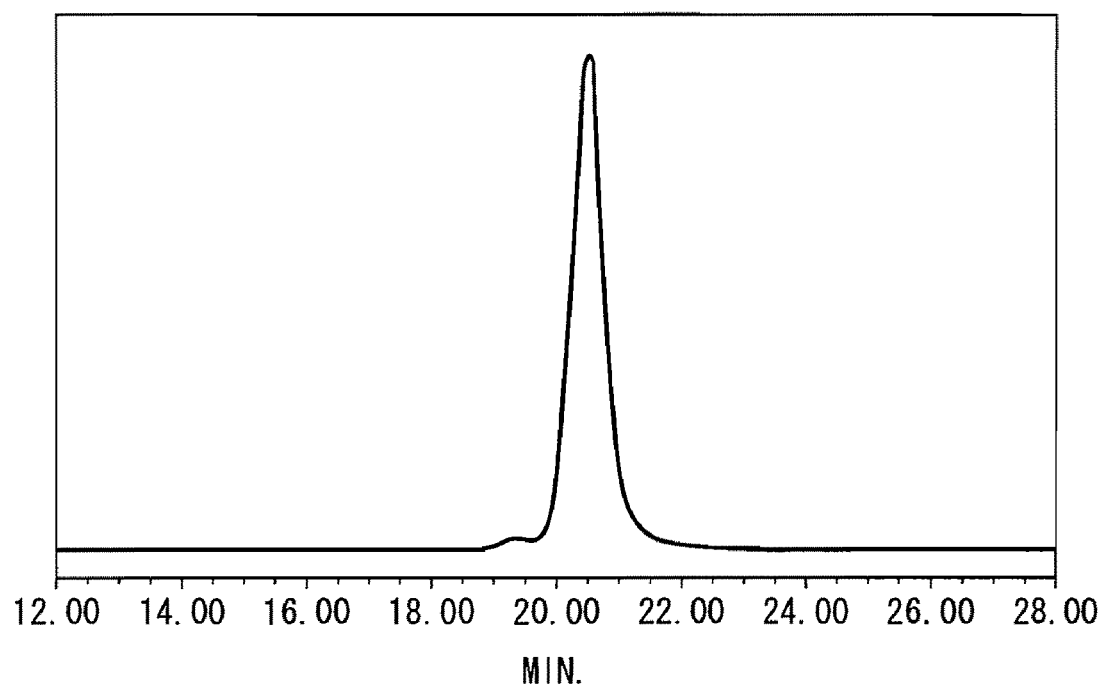
FIG. 9 shows a GPC curve of copolymer K obtained in Example 8.

The GPC curve of this copolymer K is shown in FIG. 9.

Example 9

2.52 g (8.04 mmol) of an n-BuLi solution was added to a mixed solvent of 523.3 g of THF and 62.1 g of toluene under a nitrogen atmosphere at room temperature and the resulting solution was stirred for 60 minutes. After cooling the solution to −40° C., a diethyl zinc solution (DEtZn) was added thereto until the coloring of the solvent disappeared completely to inactivate the polymerization-initiating capability of n-BuLi. The total amount of DEtZn added was 3.61 g (4.97 mmol). After adding 15.5 g (148.5 mmol) of styrene to the resulting solution, 2.18 g (5.22 mmol) of n-BuLi solution was added thereto and the mixture was stirred at −40° C. for 30 minutes. After stopping the reaction by adding methanol to the obtained reaction mixture, the resulting mixture was subjected to a reprecipitation process using a methanol solvent to obtain a reprecipitate, then the reprecipitate was filtered to obtain the retained matter, and the retained matter was air-dried to obtain styrene polymer L (yield 95%). The Mw of the polymer L was 32,200 and the ratio Mw/Mn was 1.12.

INDUSTRIAL APPLICABILITY

By using the production method of living anionic polymers of the present invention, it is possible to produce high molecular weight polymers while controlling the molecular weights thereof even if anionic polymerizable monomers or solvents which contain trace amounts of polymerization inhibiting substances are used. In other words, it is possible to produce targeted living anionic polymers where molecular weights are controlled with a high yield even if living anionic polymers are produced on an industrial scale or when anionic polymerizable monomers or solvents to be used contain trace amounts of polymerization inhibiting substances.

Moreover, the living anionic polymers obtained by the production method of the present invention, especially high molecular weight block anionic copolymers, have microstructures which are controlled to a higher order and are useful as materials for the formation of nanopatterns.

The invention claimed is:

1. A production method of polymers by using a living anionic polymerization method comprising the steps of:
   forming a reaction system in which an anion species is present which is incapable of initiating polymerization but react with polymerization inhibiting substances to convert them into compounds that allow polymerization;
   adding an anionic polymerizable monomer to the reaction system; and
   adding an anion species capable of initiating polymerization to the reaction system to which the anionic polymerizable monomer is added.

2. The production method of polymers by using a living anionic polymerization method according to claim 1, wherein the reaction system in which an anion species is present which is incapable of initiating polymerization but react with polymerization inhibiting substances to convert them into compounds that allow polymerization, is a reaction system in which an anion species which is incapable of initiating polymerization but react with polymerization inhibiting substances to convert them into compounds that allow polymerization is added to the reaction system in which an anion species capable of initiating polymerization is present.

3. The production method of polymers by using a living anionic polymerization method according to claim 1, wherein the reaction system in which anion species is present which is incapable of initiating polymerization but react with polymerization inhibiting substances to convert them into compounds that allow polymerization, is a reaction system in which an anion species capable of initiating polymerization is added to the reaction system in which an anion species is present which is incapable of initiating polymerization but react with polymerization inhibiting substances to convert them into compounds that allow polymerization.

4. The production method of polymers by using a living anionic polymerization method according to claim 1, wherein an amount of an anion species which is incapable of initiating polymerization but react with polymerization inhibiting substances to convert them into compounds that allow polymerization, is 0.5 mol or more relative to 1 mol of an anion species capable of initiating polymerization.

5. The production method of polymers by using a living anionic polymerization method according to claim 1, further comprising the steps of: adding an anionic polymerizable monomer after adding the anion species capable of initiating polymerization.

6. The production method of polymers by using a living anionic polymerization method according to claim 1, further comprising the steps of: adding a mixed solution of an anionic polymerizable monomer and anion species which is incapable of initiating polymerization but react with polymerization inhibiting substances to convert them into compounds that allow polymerization after adding the anion species capable of initiating polymerization.

7. The production method of polymers by using a living anionic polymerization method according to claim 1, wherein a reaction is carried out in a reaction system in which an anion species which is incapable of initiating polymerization but react with polymerization inhibiting substances to convert them into compounds that allow polymerization is present after removing polymerization inhibiting substances in a polymerization solvent in advance using an anion species capable of initiating polymerization.

8. The production method of polymers by using a living anionic polymerization method according to claim 1, wherein the polymerization inhibiting substances are active hydrogen compounds.

9. The production method of polymers by using a living anionic polymerization method according to claim 1, wherein the anion species which is incapable of initiating polymerization but react with polymerization inhibiting substances to convert them into compounds that allow inhibit polymerization is a triphenylmethyl anion derivative; an enolate anion; a metal alkoxide anion; an organic anion of an organic metal, which has magnesium, aluminum, or zinc as a metal species; or an organic anion of an ate complex formed from an organic alkali metal and an organic metal, which has magnesium, aluminum, or zinc as a metal species.

10. The production method of polymers by using a living anionic polymerization method according to claim 1, wherein the anion species capable of initiating polymerization is a carbon anion derived from organic alkali metals, organic alkaline earth metals, 1,1-diphenylethylene, or stilbene; or an organic anion of an ate complex which has a carbon anion derived from 1,1-diphenylethylene or stilbene as one of organometallic compounds of the pair forming the complex.

11. The production method of polymers by using a living anionic polymerization method according to claim 1, wherein the anionic polymerizable monomer is at least one selected from the group consisting of styrene derivatives, butadiene derivatives, and (meth)acrylate derivatives.

12. A production method of polymers by using a living anionic polymerization method comprising the steps of:
   forming a reaction system in which an anion species is present which is incapable of initiating polymerization but react with polymerization inhibiting substances to convert them into compounds that allow polymerization;
   adding an anionic polymerizable monomer to the reaction system; and
   adding an anion species which is incapable of initiating polymerization but react with polymerization inhibiting substances to convert them into compounds that allow polymerization, and an excessive amount of anion species capable of initiating polymerization to the reaction system to which the anionic polymerizable monomer is added.

13. The production method of polymers by using a living anionic polymerization method according to claim 12, wherein the reaction system in which an anion species is present which is incapable of initiating polymerization but react with polymerization inhibiting substances to convert them into compounds that allow polymerization, is a reaction system in which an anion species which is incapable of initiating polymerization but react with polymerization inhibiting substances to convert them into compounds that allow polymerization is added to the reaction system in which an anion species capable of initiating polymerization is present.

14. The production method of polymers by using a living anionic polymerization method according to claim 12, wherein the reaction system in which anion species is present which is incapable of initiating polymerization but react with polymerization inhibiting substances to convert them into compounds that allow polymerization, is a reaction system in which an anion species capable of initiating polymerization is added to the reaction system in which an anion species is present which is incapable of initiating polymerization but react with polymerization inhibiting substances to convert them into compounds that allow polymerization.

15. The production method of polymers by using a living anionic polymerization method according to claim 12, wherein an amount of an anion species which is incapable of initiating polymerization but react with polymerization inhibiting substances to convert them into compounds that allow polymerization, is 0.5 mol or more relative to 1 mol of an anion species capable of initiating polymerization.

16. The production method of polymers by using a living anionic polymerization method according to claim 12, further comprising the steps of: adding an anionic polymerizable monomer after adding the anion species capable of initiating polymerization.

17. The production method of polymers by using a living anionic polymerization method according to claim 12, further comprising the steps of: adding a mixed solution of an anionic polymerizable monomer and anion species which is incapable of initiating polymerization but react with polymerization inhibiting substances to convert them into compounds that allow polymerization after adding the anion species capable of initiating polymerization.

18. The production method of polymers by using a living anionic polymerization method according to claim 12, wherein a reaction is carried out in a reaction system in which an anion species which is incapable of initiating polymerization but react with polymerization inhibiting substances to convert them into compounds that allow polymerization is present after removing polymerization inhibiting substances in a polymerization solvent in advance using an anion species capable of initiating polymerization.

19. The production method of polymers by using a living anionic polymerization method according to claim 12, wherein the polymerization inhibiting substances are active hydrogen compounds.

20. The production method of polymers by using a living anionic polymerization method according to claim 12, wherein the anion species which is incapable of initiating polymerization but react with polymerization inhibiting substances to convert them into compounds that allow inhibit polymerization is a triphenylmethyl anion derivative; an enolate anion; a metal alkoxide anion; an organic anion of an organic metal, which has magnesium, aluminum, or zinc as a metal species; or an organic anion of an ate complex formed from an organic alkali metal and an organic metal, which has magnesium, aluminum, or zinc as a metal species.

21. The production method of polymers by using a living anionic polymerization method according to claim 12, wherein the anion species capable of initiating polymerization is a carbon anion derived from organic alkali metals, organic alkaline earth metals, 1,1-diphenylethylene, or stilbene; or an organic anion of an ate complex which has a carbon anion derived from 1,1-diphenylethylene or stilbene as one of organometallic compounds of the pair forming the complex.

22. The production method of polymers by using a living anionic polymerization method according to claim 12, wherein the anionic polymerizable monomer is at least one selected from the group consisting of styrene derivatives, butadiene derivatives, and (meth)acrylate derivatives.

* * * * *